Oct. 4, 1966 H. CANCRINUS ETAL 3,276,291

INERTIA FLUID TORQUE TRANSMITTER

Filed Dec. 11, 1963

6 Sheets-Sheet 1

Hendrik Cancrinus and Eric H. Friedmann

Inventors

By Wenderoth, Lind and Ponack Attorneys

Oct. 4, 1966 H. CANCRINUS ETAL 3,276,291

INERTIA FLUID TORQUE TRANSMITTER

Filed Dec. 11, 1963

6 Sheets-Sheet 2

Hendrik Cancrinus and Eric H. Friedmann Inventors

By Wenderoth, Lind and Ponack Attorneys

Oct. 4, 1966 H. CANCRINUS ETAL 3,276,291

INERTIA FLUID TORQUE TRANSMITTER

Filed Dec. 11, 1963 6 Sheets-Sheet 3

Hendrik Cancrinus and Eric H. Friedmann
Inventors

By Wenderoth, Lind and Ponack
Attorneys

Hendrik Cancrinus
and Eric H. Friedmann
Inventors

By Wenderoth,
Lind and Ponack Attorneys

Hendrik Cancrinus
and Eric H. Friedman
Inventors

By Wenderoth,
Lind and Ponack Attorneys

Oct. 4, 1966 H. CANCRINUS ETAL 3,276,291
INERTIA FLUID TORQUE TRANSMITTER
Filed Dec. 11, 1963
6 Sheets-Sheet 6
FIG. 20
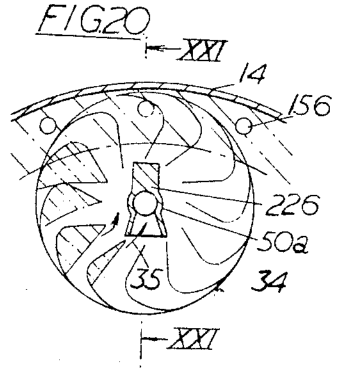
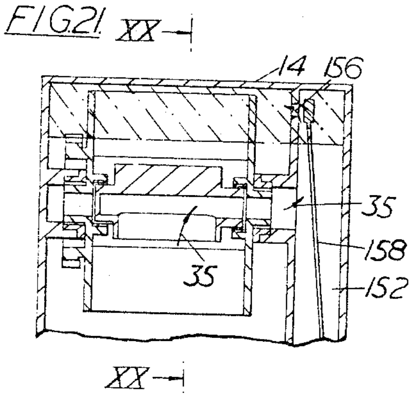
FIG. 22
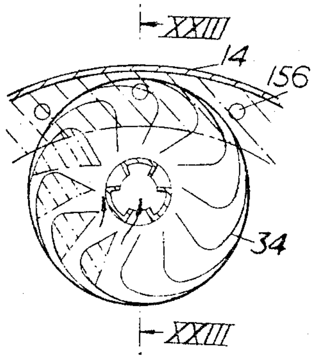
FIG. 23
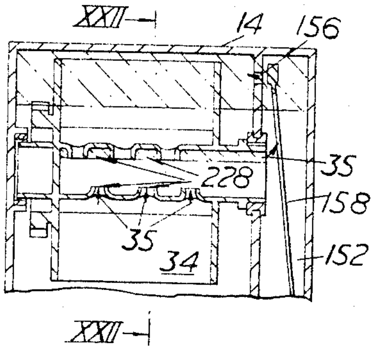
FIG. 24
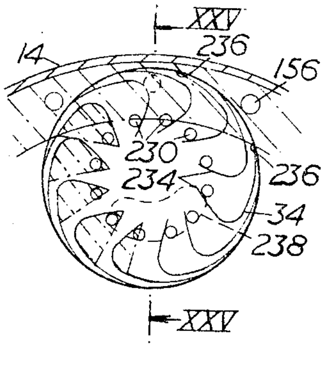
FIG. 25
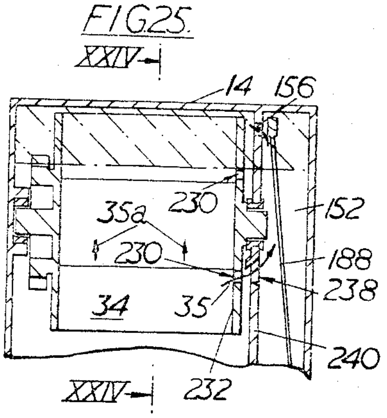
Inventors
Hendrik Cancrinus
and Eric H. Friedmann
By Wenderoth, Lind
and Ponack, Attorneys United States Patent Office
3,276,291
Patented Oct. 4, 1966

3,276,291
INERTIA FLUID TORQUE TRANSMITTER

Hendrik Cancrinus and Eric Helmüth Friedmann, both of Cape Town, Cape Province, Republic of South Africa, assignors to Inpower Works (Proprietary) Limited, Cape Town, Cape Province, Republic of South Africa Filed Dec. 11, 1963, Ser. No. 329,657
Claims priority, application Republic of South Africa, Dec. 14, 1962, 62/5,289
19 Claims. (Cl. 74—752)

This invention relates to a fluid torque transmitter for transmitting torque by inertia. It relates in particular to a transmitter, in which the torque can be controlled.

According to the invention a torque transmitter includes a carrier; at least one planet wheel mounted on the carrier to rotate about its own axis; a reservoir in the form of a drum coaxial with the carrier and a second axis and adapted to contain liquid, the carrier and drum being mounted to rotate about the second axis; a power input member connected to the carrier for connecting it to a source of rotary power; a sun wheel coaxial with the second axis; a power output member connected to the sun wheel for connecting it to a load to absorb rotary power; intermediate drive means drivingly connecting the planet wheel to the sun wheel and applying torque developed about the planet wheel axis in the same direction about the second axis; a bucket wheel coaxial with and connected to the planet wheel and having a plurality of buckets defining recesses spaced circumferentially about the planet wheel axis, the buckets having inner and outer lips defining openings directed in one direction about the planet wheel axis, and the bucket wheel having at least one axially directed opening out of it and disposed radially inwardly of the outer lips of the buckets relative to the planet wheel axis, and the bucket wheel being adapted to entrap liquid in the recesses from an annular layer of liquid within the drum when the carrier rotates about its axis and when the bucket wheel rotates about its axis relative to the carrier, and the buckets being adapted to reject entrapped liquid radially inwardly and thence out of the bucket wheel via the axially directed opening.

The bucket wheel may be mounted on a hollow shaft and the axially directed opening out of the bucket wheel may be provided by the hollow shaft having an opening disposed radially inwardly of the inner lips of the buckets and by an opening out of the hollow shaft and axially spaced from the first mentioned opening and outside the bucket wheel.

The hollow shaft may be provided with a skirt around the opening disposed radially inwardly of the inner lips of the buckets, the skirt diverging towards the carrier axis.

The bucket wheel may have radial openings into it, between adjacent buckets. Fluid entrapment control means may be provided, adapted to control the entrapment of liquid by the bucket wheel during rotation of the carrier. The fluid entrapment control means may include a shroud around the bucket wheel and coaxial with it and having a plurality of circumferentially spaced axially directed cover members at a pitch corresponding to the spacing between buckets and projecting over the buckets of the bucket wheel, the connection between the planet wheel and bucket wheel being resilient; whereby under load conditions exceeding a predetermined load, the bucket wheel and shroud are displaced arcuately relative to each other about their axes, thereby causing the cover members of the shroud to be displaced to cover openings between adjacent buckets, thereby controlling the entrapment of liquid from the annular layer. The fluid entrapment control means may include cam faces provided coaxially on the planet wheel and shroud, follower members connected to the bucket wheel and co-operating with the cam faces, and projections on the outer surface of the shroud.

The drum and the carrier may be integral and the carrier may have a plurality of compartments, one of which contains the bucket wheel, and in which the axially directed opening out of the bucket wheel is arranged to discharge into a compartment other than the bucket wheel compartment, at least one connecting port being provided to interconnect the compartments. The fluid entrapment flow control means may include preventing means to prevent fluid flow into the bucket wheel compartment, the bucket wheel being adapted to displace liquid from its own carrier compartment into another carrier compartment via the axially directed opening.

The preventing means may include a movable closure member adapted to seat sealingly on the port, and control means to displace the closure member relative to the port. The preventing means may include further a sleeve member coaxial with the carrier and connected to the closure member, the control means being arranged to displace the sleeve axially to position the closure member. The control means may include a resilient connection permitting resilient relative arcuate displacement between the power input member and the carrier, and being adapted to utilise such displacement to position the closure member. If desired, the control means may include a resilient connection permitting resilient relative arcuate displacement between the sun wheel and the power output member, and being adapted to utilise such displacement to position the closure member. The resilient connection may be a torsion shaft. The control means may include a sleeve coaxial with the power output member and passing axially and rotatably into the carrier, and being connected to the closure member, bias means to bias the sleeve axially towards an initial position relative to the power output member, and means responsive to speed of the power output member adapted to displace the sleeve against the action of the bias means.

Instead of a single planet wheel only being provided as the first planet wheel, a set of planet wheels may be provided, drivingly associated via intermediate drive means, with the first sun wheel. This set of planet wheels may be provided in one compartment of the carrier, and another set of planet wheels may be provided in another compartment of the carrier, and cooperating with another sun wheel, the positioning of the closure member, being adapted to control the flow of liquid in the compartments.

The planet and sun wheels may be toothed gear wheels, and the intermediate drive means may be a toothed idler mounted to rotate on the carrier, and meshing simultaneously with the planet and sun wheels. Alternatively, a set of planet wheels may be provided with two sun wheels fast with each other and having the same pitch diameters and being sprockets, the planet wheels also being sprockets, and engaging via drive chains with the sun wheels. If desired, one or both of the sun wheels of the sets of planet wheels may be connected via gear trains to a common output shaft, at least one of the gear trains, including a free wheel device. The different sets of planet wheels are conveniently mounted in dynamic balance about the second axis.

A description of the invention will now be given by way of example with reference to the accompanying drawings.

In the drawings:

FIGURE 20 shows a detail cross-sectional view of a particular type of hollow shaft, at XX—XX in FIGURE 21;

FIGURE 21 shows an axial section as XXI—XXI in FIGURE 20;

FIGURE 22 shows a detail cross-sectional view at XXII—XXII in FIGURE 23, of another type of hollow shaft for a bucket wheel;

FIGURE 23 shows an axial section at XXIII—XXIII in FIGURE 22;

FIGURE 24 shows a detail cross-sectional end elevation of another type of bucket wheel, at XXIV—XXIV of FIGURE 25; and FIGURE 25 shows an axial section at XXV—XXV of FIGURE 24.

Figures 1, 2, 3, 4:
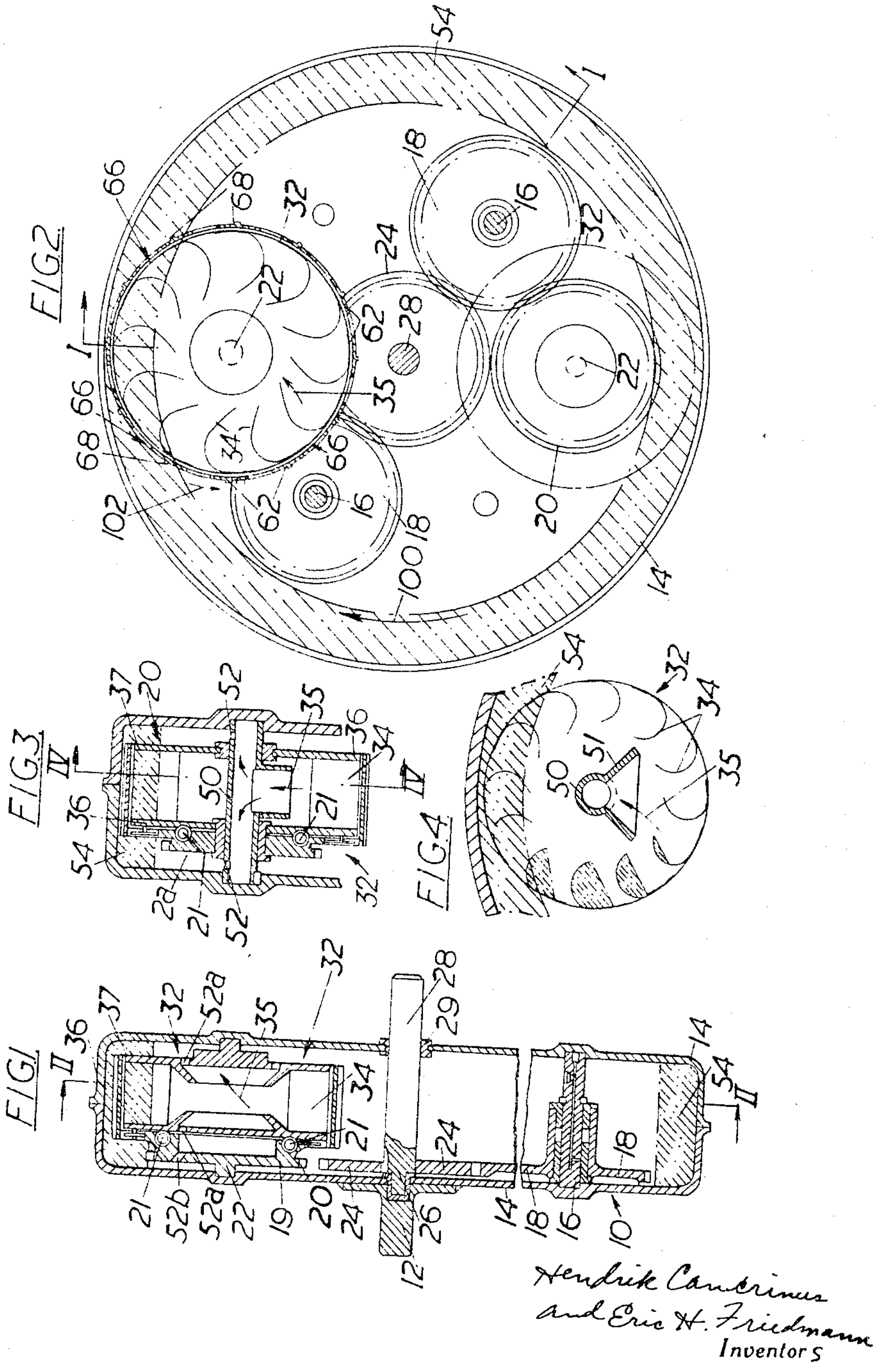
FIGURE 1 shows a sectional side elevation at I—I of one embodiment of the invention adapted to cut out under overload.
FIGURE 2 shows a sectional end elevation at II—II corresponding to FIGURE 1.
FIGURE 3 shows a sectional side elevation of a form of planet wheel and bucket wheel alternative to that shown in FIGURE 1.
FIGURE 4 shows a sectional end elevation of the planet wheel and bucket wheel at IV—IV and corresponding to FIGURE 3.

Reference numeral 10 refers generally to a torque transmitter comprising an input shaft 12 fast with drum 14 which also forms a carrier, and which carries pins 16 supporting gear-toothed idlers 18 meshing with planet wheels 20 supported by journals 22. Coaxial with drum 14 and input shaft 12, is provided sun wheel 24 meshing with the idlers 18 and having a coaxial stub axle 26 supported in a socket provided in drum 14. The sun wheel 24 also has an output shaft 28 coaxial with it, which is carried in bearing 29 in drum 14. It will be noted that the pitch diameters of the sun wheel 24 and planet wheels 20 are equal.

Resiliently connected to each planet wheel 20 via circumferentially spaced coil springs 21, is provided a bucket wheel 32 having a plurality of buckets 34 spaced circumferentially in dynamic balance about the planet wheel axis. The buckets 34 are of substantially C-section and are located between two discs 36 and 37. The openings of the buckets 34 are directed in one direction about the planet wheel axis.

Figures 5, 6, 7, 8, 9, 10:
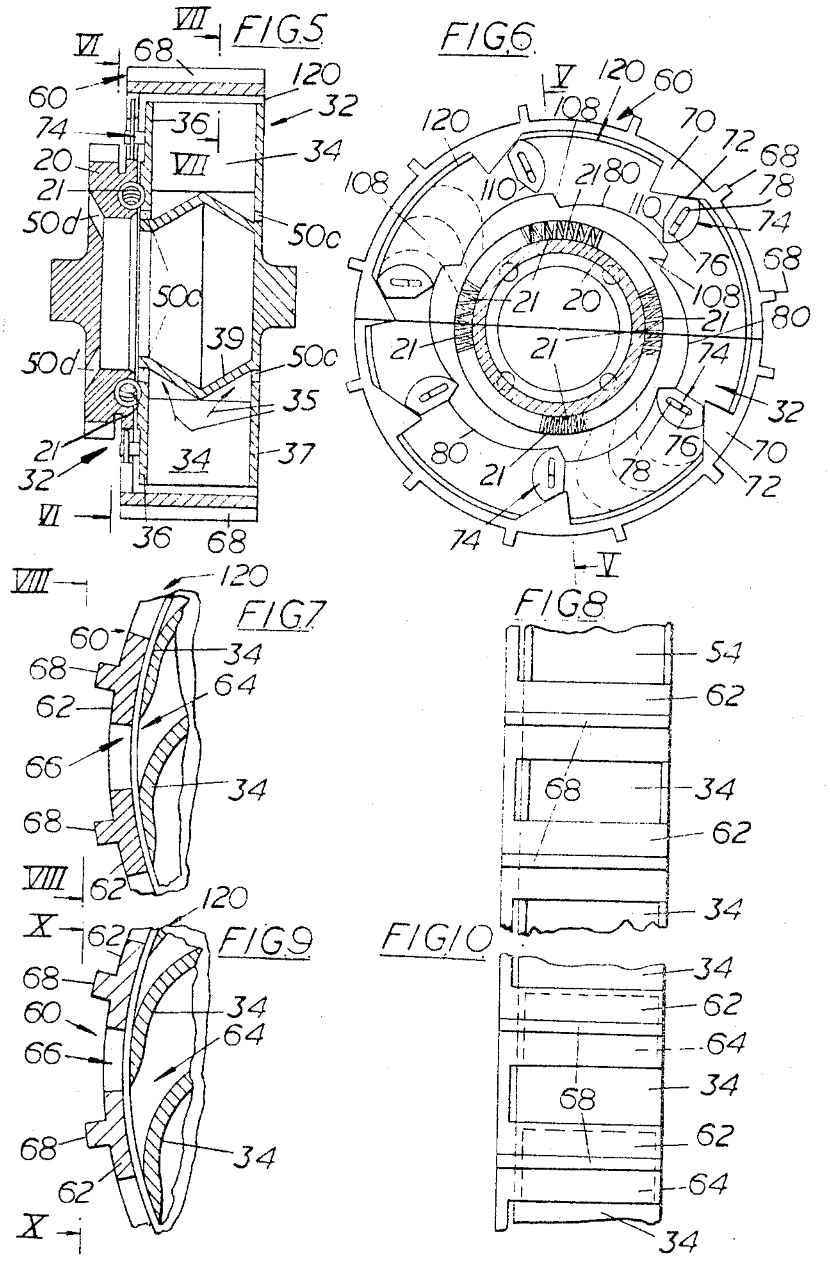
FIGURE 5 shows a sectional side elevation at V—V of a bucket and planet wheel of further alternative construction.
FIGURE 6 shows a sectional end elevation at VI—VI of the bucket and planet wheel shown in FIGURE 5.
FIGURE 7 shows a detail part end elevation at VII—VII in FIGURE 5.
FIGURE 8 shows a developed plan view at VIII—VIII of FIGURE 7.
FIGURE 9 shows a detail part end elevation similar to FIGURE 7 but with a different shroud position.
FIGURE 10 shows a developed plan view at X—X in FIGURE 9.

Referring to FIGURES 1, 3, and 4 of the drawings, it will be noted that the buckets 34 reject liquid in the direction of arrow 35, when they approach the central region of the drum. Such rejected liquid will travel axially along hollow shaft 50 through openings 52, 52*a* and 52*b*, and into the drum towards the annular layer of liquid 54. The hollow shaft 50, has a skirt 51 and is fast with the drum 14. Referring to FIGURE 5 of the drawings, an alternative arrangement is shown whereby liquid rejected in the direction of arrow 35, is deflected by shield 39, and flows axially and outwardly via openings 50*c* and thence via openings 50*d* to the outer peripheral annular layer of liquid 54.

Referring to FIGURES 6 and 7 of the drawings, reference numeral 60 refers generally to a shroud having axially projecting cover members 62 having a width corresponding to the circumferential opening 64 between the outer edges of adjacent buckets. In FIGURES 7 and 8, the openings 66 between adjacent cover members are in register with the opening 64 between adjacent buckets, thus permitting the outward flow of liquid from the buckets out through the registering openings. The shroud 60, is provided with outwardly projecting ridges 68 adapted to provide a drag torque on the shroud, as the planet wheel rotates through the annular layer of liquid. The shroud is further provided with a plurality of cams 70, having sloping faces 72 adapted to engage with cam followers 74 guided for radial sliding by pins 76 engaging with slots 78. The pins 76 are fast with the side wall 36 of bucket wheel 32. Planet wheel 18 is provided with a series of circumferentially spaced sloping cam faces 80 adapted to engage with the inner ends of cam followers 74.

The upper half of FIGURE 6 shows the relative positions of the shroud, planet wheel, and cam followers, corresponding to that shown in FIGURES 7 and 8, namely when the openings 66 between adjacent cover members of the shroud are in register with the openings 64 between adjacent buckets, i.e. at start up. The lower half of FIGURE 6 shows the relative positions of the shroud, followers 74, and planet wheel, corresponding to the positions shown in FIGURES 9 and 10, namely that is when the cover members are in position to close off the openings 64 between adjacent buckets of the bucket wheel 32, i.e. after an overload torque has been transmitted.

In operation, if the drum is rotated in the direction of arrow 100, and if the output shaft 28 is stationary or if it rotates at any speed less than that of the input shaft, then the bucket wheel 32 will rotate about its axis in the direction of arrow 102 relative to the drum. The rate of rotation of the bucket wheel will depend upon the difference in speed between the input and the output shafts. When the difference is great, then the speed of rotation of the bucket wheel will also be large. As the output shaft speeds up, so the rate of rotation of the bucket wheel will decrease until such time that the velocity ratio between input and output shaft is unity, and then the bucket wheel 32 will be stationary relative to the drum, the torque being generated about its axis by centrifugal force acting on the mass of fluid in the buckets as shown in FIGURE 4, being sufficient to counterbalance the full load torque on the output shaft.

If now the load torque increases to a value beyond the maximum full load torque capacity available as a result of centrifugal force on the unbalanced mass of fluid about the planet wheel axis, then the planet wheel will again start rotating about its axis, and as it rotates in the annular layer of fluid, so a drag torque will be exerted on the shroud 60 at the ribs 68 and will cause the shroud to be arcuately displaced relative to the bucket wheel 32 about its axis, thus causing cover members 62 to slide over openings 64 to close them off. This displacement also causes the faces 72 of the cams 70 to slide up against the sloping corresponding and mating faces of the cam follower plates 74, and causes the inner ends of the cam followers to slide into the lower regions of the cam faces 80. The slope of the faces 108 and 110 is such that they are self-locking under the drag torque on the shroud, which remains in the closed position as shown in FIGURES 9 and 10, thus preventing the re-entry of liquid into the buckets of the bucket wheel. The contained liquid, i.e. the liquid still contained in the buckets, will gradually drain away from the planet wheel during its rotation and in the direction of arrows 35, and out through openings 50, 50c, 50d, and 52, 52a, and 52b. As soon as the bucket wheel loses its liquid, it also loses its torque and consequently once the shroud has operated for its cover members 62 to close off the openings 64 between the lips of adjacent buckets, no more torque can be generated by centrifugal force to drive the load. The drag torque also maintains the shroud in its closed position. As soon as the input torque stops, i.e. the drag torque falls off to zero, the springs 21 automatically reset the shroud in its open position, the bucket wheels thus being ready to generate torque again upon restarting.

The clearance shown at 120 i.e. between the outer periphery of the bucket wheel and the shroud, is reduced to a minimum to ensure free sliding of the bucket wheel within the shroud, and yet also to ensure good sealing of the openings 64 by the cover members 62, when they are in position to close off the openings 64.

The upper half of FIGURE 6 shows the relative positions of bucket wheel and shroud when the openings 64 are not closed off while the lower half shows the relative positions of the parts when the openings are closed off. An advantage of this invention is that a predetermined maximum torque can be transmitted, which, if exceeded, will cause the shroud to move into sealing position, thus causing the planet wheels to lose their liquid and not being able to replenish them, the torque transmitter loses its torque transmitting capacity, and the carrier then merely rotates freely within the drum. The apparatus functions therefore as a coupling having a maximum overload drive characteristic, such that a predetermined maximum torque can be transmitted, which, if exceeded will cause the coupling to slip at maximum torque and then to slip without transmitting any torque. Such a coupling therefore protects both a prime mover as well as its coupled load against excessive torques. Once the prime mover has stopped, then the shroud automatically moves into its open position under the action of the springs 21.

Figures 11, 12:
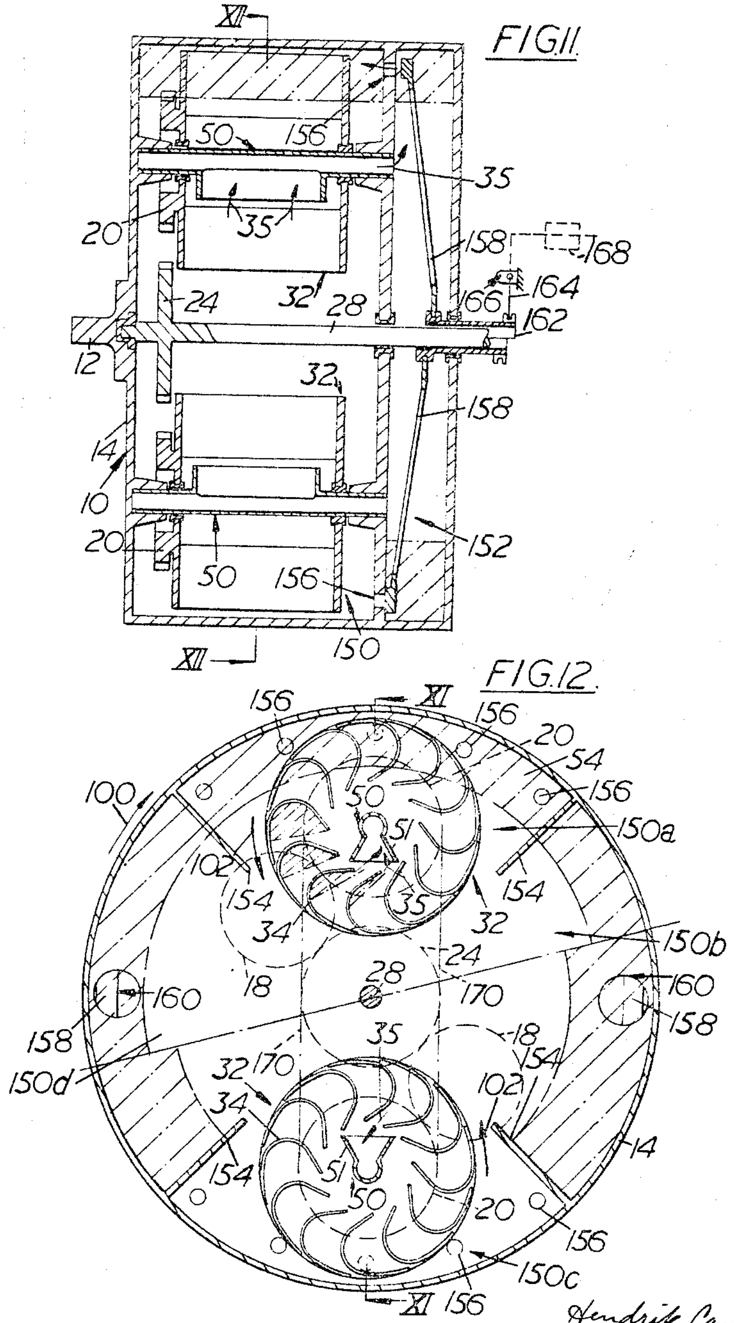
FIGURE 11 shows an axial section of another embodiment of the invention, at XI—XI in FIGURE 12.
FIGURE 12 shows a cross-sectional end elevation at XII—XII of FIGURE 11.

Referring now to FIGURES 11 and 12, a carrier 14 is shown, which is also a drum, and which is divided into two axially spaced compartments 150 and 152. The compartment 150, is further divided into four separate sub-compartments 150a, 150b, 150c, and 150d, by radially extending walls 154. Sub-compartments 150a and 150c, are in communication with the compartment 152, via openings 156. Closure member 158, which is coaxial with the output shaft 28, and which is axially displaceable relative thereto, is adapted to close off these openings 156. The sub-compartments 150b and 150d, are in communication with the compartment 152 via the openings 160. The closure member 158 is not adapted to close off the openings 160.

The lower half of FIGURE 11, shows the closure member 158 in the closed position, in which it is seated on the openings 156, to close them off. These openings 156, constitute ports between the compartments. The upper half of FIGURE 11, shows the closure member 158 unseated, thereby permitting flow from compartment 152, into compartment 150a.

The closure member 158, is connected to a sleeve 162, coaxial with the output shaft 28, and extending through the side wall of the drum 14, the sleeve 162 being axially displaceable relative to the drum 14, thereby permitting axial displacement of the closure member 158.

Displacement of the sleeve 162, may take place by a lever, for manual operation, a pedal for foot operation, or may take place pneumatically, hydraulically, or electrically. In FIGURE 11, the lever is shown diagrammatically by reference numeral 164, having a fulcrum 166, and shown diagrammatically as being connected to hydraulic, pneumatic, or electrical operating means 168.

It will be understood that instead of making use of idlers 18, as intermediate drive means between the sun wheel 24 and the planet wheel 20, use may be made of chains 170 meshing with sun and planet wheels, which are then toothed sprockets.

In operation, when the drum 14 is rotated in the direction of arrow 100, then the bucket wheels 32 will rotate relative to the carrier, in the direction of arrow 102, while the output shaft is stationary, or is rotating at a speed less than the input speed to the carrier. In thus rotating about its axis, the buckets 34 of the bucket wheels 32, will entrap liquid from the annular layer 54, and will carry it towards the carrier axis, on the trailing side of the bucket wheel relative to the direction of rotation of the carrier about the carrier axis.

The entrapped liquid in the buckets 34 of the bucket wheels 32, are subjected to centrifugal force, directed outwardly from the carrier axis, and a moment is exerted about the bucket wheel axis, which is transmitted over the intermediate drive means onto the sun wheel 24, and hence onto the output shaft, and is available to drive a load. As the output shaft speeds up, so the rate of rotation of the bucket wheel relative to the carrier slows down, until finally when the output shaft speed is the same as the speed of the drum, the bucket wheel no longer rotates about its axis relative to the carrier, and merely rotates in unison with the carrier, about the carrier axis, the moment exerted by the mass of the entrapped liquid under the action of centrifugal force, being sufficient to supply the load torque to the output shaft.

Referring to FIGURE 12, it will be noted that when the buckets 34 pass in the region between the planet wheel and carrier axes, entrapped fluid is rejected in the direction of arrows 35, which then passes along the hollow shaft 50, into the compartment 152. If now the ports 156 are not closed off, then the fluid will merely re-circulate from compartment 152, back into sub-compartments 150a and 150c. In other words, the annular layer 54 within the compartments 150a and 150c, will be replenished as fast as liquid is being pumped out of these compartments, by their bucket wheels.

If, however, the ports 156 are closed off, as shown in the lower half of FIGURE 11, then such replenishment cannot take place, and ultimately all the liquid will have been pumped out of these compartments, as shown in compartment 150c of FIGURE 12.

It will be apparent, therefore, that by suitably controlling the displacement of the sleeve 162, and hence of the closure member 158, the torque output of the coupling can be controlled. For example, control means may be provided, whereby the sleeve 162 is displaced axially, in response to variations in torque demand, or in response to the speed of the output shaft, or in response to the speed of the carrier. These features will be described more fully hereafter.

Figures 13, 14:
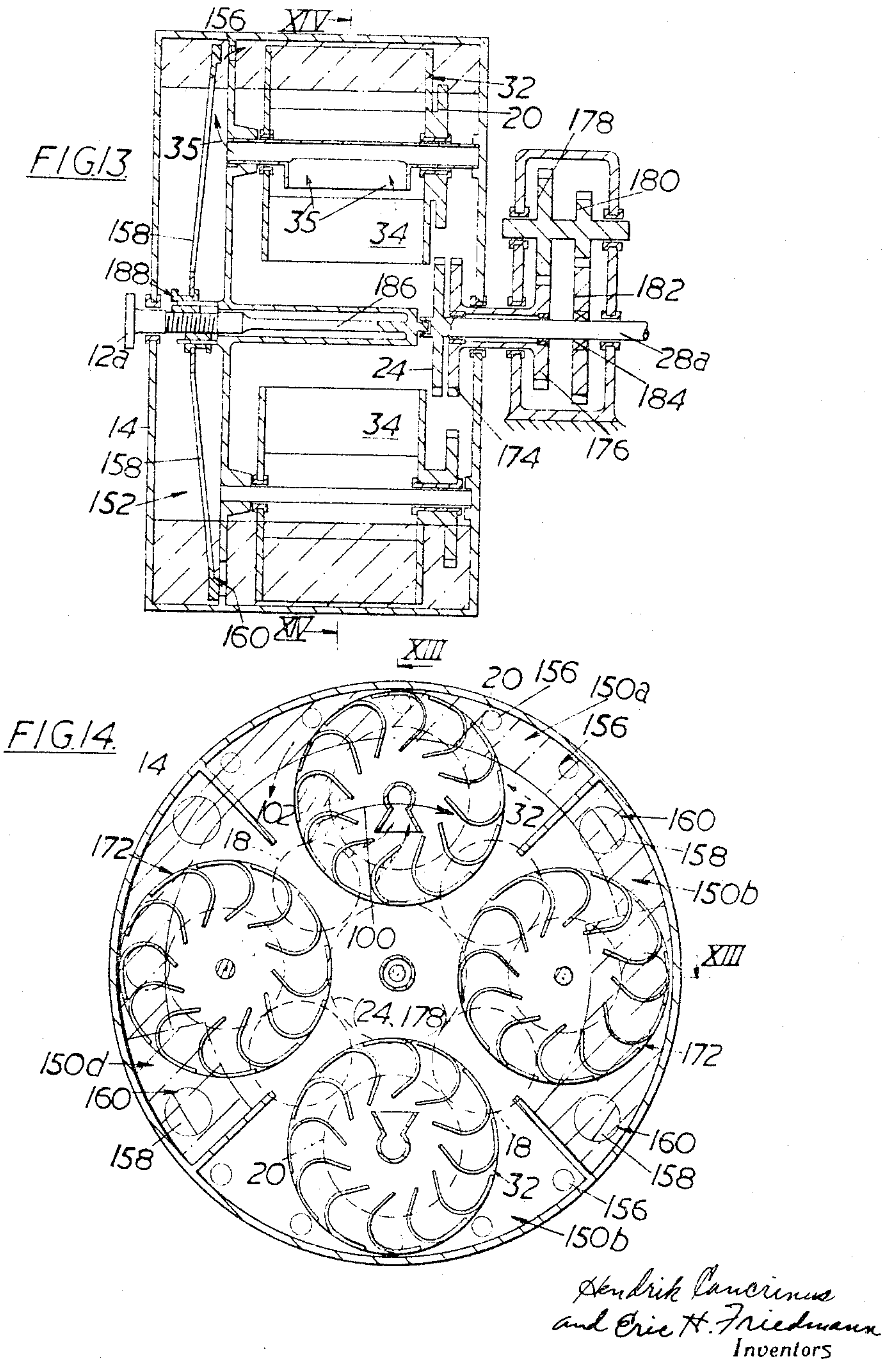
FIGURE 13 shows an axial section of another embodiment of the invention at XIII—XIII in FIGURE 14.
FIGURE 14 shows a cross-sectional end elevation at XIV—XIV of FIGURE 13.

Referring now to FIGURES 13 and 14 of the drawings an additional set of bucket wheels together with associated planet wheels and idlers are shown in the compartments 150b and 150d. It is therefore possible, by suitably positioning the closure member 158, to bring the sets of bucket wheels selectively into operation for the generation of torque. It will be noted that in the arrangement shown in FIGURE 14, the compartments 150b and 150d will always have liquid in them, so that the bucket wheel set comprised of bucket wheels 172, will always be generating torque, when the carrier is rotated. These bucket wheels 172 are connected via intermediate drive means to sun wheel 174, coaxial with the output shaft 28a and via gears 176, 178, 180 and 182 and free wheel device 184 to the output shaft 28a.

The bucket wheel set comprised of bucket wheels 32, are connected via their intermediate drive means, to sun wheel 24, which is directly connected to the output shaft 28*a*.

In view of the ratio of the gears 176 to 182, the output shaft 28*a*, will rotate at a speed which is less than that of the carrier 14, at the time when movement of the bucket wheels 172 relative to the carrier stops. If now the closure member 158 is displaced, to allow the entry of liquid from compartment 152 into subcompartments 150*a* and 150*b*, then torque will be generated by the bucket wheel set, comprised of bucket wheels 32 and this torque will be carried over via their intermediate drive means, onto the sun wheel 24 and hence onto the output shaft 28*a* which will be further speeded up, until such time as movement of the bucket wheels 32 relative to the carrier stops, and when the output shaft 28*a*, will be rotating at the same speed as the carrier 14.

The control of the position of the closure member 158, may be manual, pneumatic, hydraulic, or electric; or it may be automatic, by means of the construction shown in FIGURE 13, namely the provision of a torsion bar 186, between the carrier 14 and the input shaft 12*a*, and coaxial with the carrier. A helical cam arrangement generally indicated by reference numeral 188, and connected to the closure member 158, is provided on the input shaft 12*a*. Torsional displacement of the input shaft 12*a* relative to the drum 14, under load, will cause the helical cam arrangement 188 to displace the closure member off the ports 156, thereby permitting fluid to flow into the subcompartments 150*a* and 150*b* and thereby permitting the generation of torque over the bucket wheels 32, after an initial load has been taken.

The arrangement shown in FIGURES 13 and 14 provides a high starting torque via the gears 176 to 182 and automatic switch-over to a higher speed of the output shaft, when a predetermined minimum torque on the input shaft has been reached.

Figures 15, 16, 17, 18, 19:
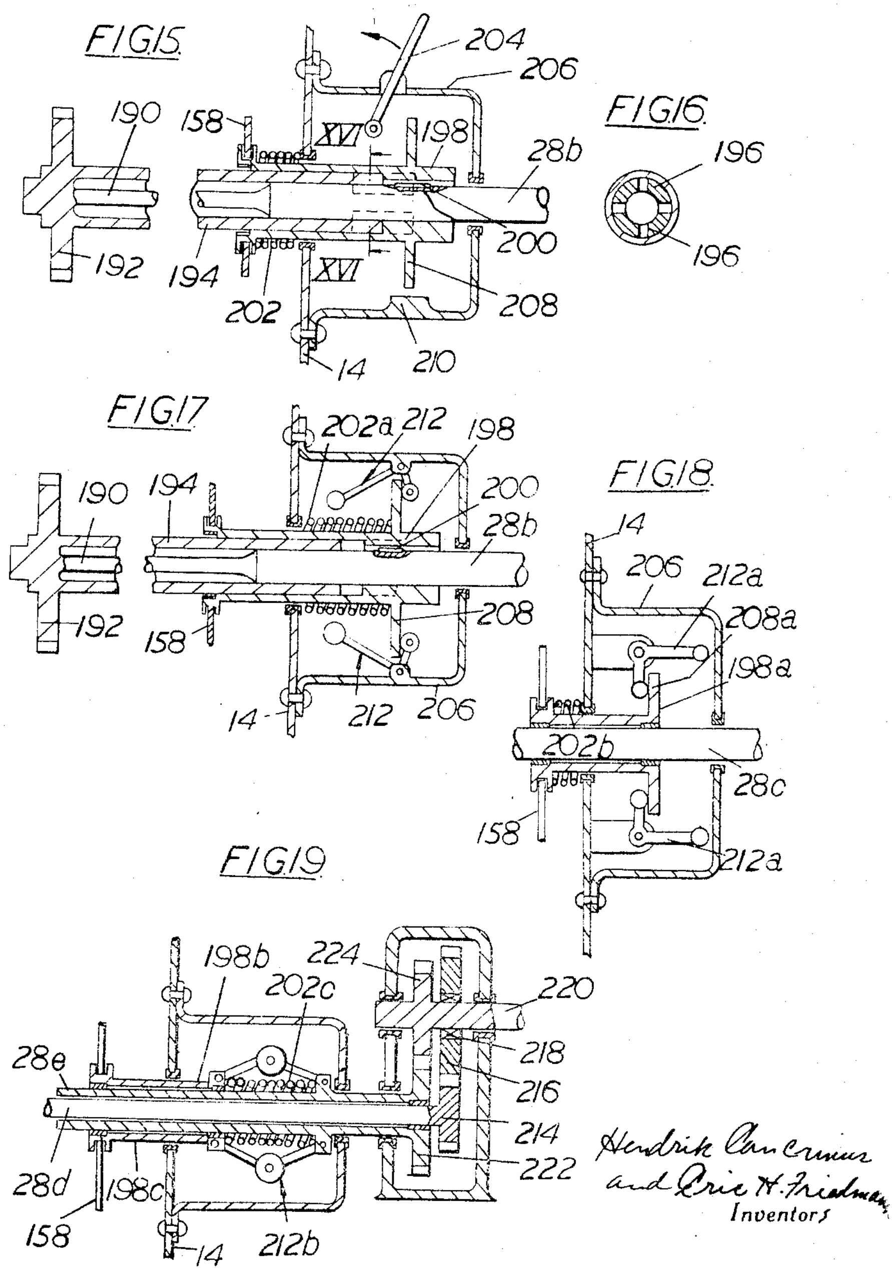
FIGURE 15 shows a detail axial section of one type of control means.
FIGURE 16 shows a cross-section at XVI—XVI of FIGURE 15.
FIGURE 17 shows a detail axial section of another type of control means.
FIGURE 18 shows a detail axial section of yet another type of control means.
FIGURE 19 shows an axial section of another type of control means responsive to speed of a power output member.

Referring now to FIGURES 15 and 16 of the drawings, the arrangement there shown is adapted to be applied to the embodiment of FIGURES 11 and 12, which will cause the coupling to cut out under overload applied to the output shaft.

In this arrangement, the output shaft 28*b*, is connected via a torsion shaft 190 to a sun wheel 192 which is drivingly associated via intermediate drive means wih the buckets wheels 32. Fast with the sun wheel 192, and coaxial with it is a sleeve 194, having a plurality of circumferentially spaced and axially projecting fingers 196 at its end.

A control sleeve 198, is keyed by means of a feather key 200, or by means of splines, to output shaft 28*b*, and extends coaxially with the output shaft, around the sleeve 194 into the drum 14 where it engages the closure member 158. The bore of the control sleeve 198, where it slides on the output shaft 28*b*, is provided with a plurality of slots and ridges, extending axially and spaced circumferentially. Under no load, the ridges are in register with the axially projecting fingers of the sleeve 194. A helical spring 202, urges the ridges into abutment with the fingers 196. As soon as a predetermined maximum load on the output shaft 28*b* is reached, then it will deflect torsionally, thereby bringing the slots in the bore of the control sleeve 198 in register with the fingers, and thereby permitting the control sleeve 198 to be axially displaced relative to the output shaft and hence causing the closure member 158 to be axially displaced relative to the carrier 14, and thus closing off the ports 156. This closure of the ports 156, prevents the sub-compartments 150*a* and 150*c* from being recharged with liquid, and thus the torque generated by the bucket wheels 32 will fall off, until the subcompartments 150*a* and 150*c* are completely empty and no torque will be transmitted.

Resetting of the coupling for the transmission of torque, can only take place after the coupling has been stopped, by means of the lever 204 pivotally mounted in a bracket 206 connected to the drum 14, by engagement with the flange 208 fast with the control sleeve 198. A mass 210, is provided on the bracket 206, in order to counterbalance the lever 204.

Referring now to FIGURE 17 of the drawings, the arrangement is somewhat similar to that described with reference to FIGURES 15 and 16, except that helical coil spring 202, is arranged to keep the slots of control sleeve 198 out of engagement with the fingers 196 of sleeve 194. Weighted bell crank levers 212, are mounted inside bracket 206, and are arranged to coact with the flange 208 of the control sleeve 198, to displace it axially against the action of the helical spring 202, when the drum 14 rotates. Under no load, the fingers of sleeve 194 are in register with the ridges in the bore of the control sleeves 198 and in operation, the weighted bell crank levers 212, merely urge the ridges and the fingers into abutment. But if a torque occurs on the output shaft 28*b*, sufficient to cause torsional deflection in it, to bring the fingers 196 into register with the slots in the bore of the control sleeve 198, then the weighted bell crank levers will push the sleeve 198 axially against the action of the spring 202*a*, thereby causing the fingers to engage with the slots in the bore of the control sleeve 198. Such displacement of the control sleeve 198, will displace also the closure member 158, and will close off the ports 156, with the same results as before.

Resetting of the machine is automatic after it is stopped, because then the spring 202*a*, will press the control sleeve 198 out of engagement with the fingers of sleeve 194, and the prime mover may be restarted.

Referring to FIGURE 18 of the drawings, control sleeve 198*a* is shown arranged coaxially with output shaft 28*c*, the control sleeve engaging with the closure member 158. The control sleeve 198*a* is urged by means of helical spring 202*b*, into such a position that the closure member 158 seats on the ports 156. Weighted bell crank levers 212*a*, are provided, pivotally connected to the carrier 14, and arranged to coact with the flange 208*a*, of the control sleeve 198*a*. This arrangement ensures that fluid will only enter into the subcompartments 150*a* and 150*c*, when the carrier 14 has reached a predetermined speed, the weighted bell crank levers 212*a* being adapted to displace the control sleeve 198*a*, against the action of the helical spring 202*b*. This arrangement provides for easy starting under load. Referring to FIGURE 19 of the drawings, there is shown an arrangement, which is adapted for use with an embodiment similar to that shown in FIGURES 13 and 14, but without the helical cam arrangement 188 and torsion shaft 186. The output shaft 28*d*, is connected directly to a sun wheel such as 24 of FIGURE 13, whereas the hollow output shaft 28*e* is connected to a sun wheel such as 174 of FIGURE 13, but connected via intermediate drive means, to a set of bucket wheels such as 32. The control sleeve 198*b*, is connected via swing weights 212*b*, to the hollow output shaft 28*e*. The output shaft 28*d* is connected via its sun wheel, to a set of bucket wheels such as 172 which are always in liquid, thereby being able to generate torque, whenever the carrier 14 rotates. The output shaft 28*d*, is connected via gears 214, 216 and free wheel 218, to main output shaft 220, thereby obtaining torque conversion. As soon as the output shaft 28*e*, has reached a predetermined minimum speed, the fly weights 212*b*, will displace the control sleeve 198*b*, against the action of the helical spring 202*c*, thereby opening the ports 156, and thereby permitting the generation of torque over planet wheels such as 32, which torque is then transmitted to the main output shaft 220, via gears 222 and 224. This arrangement shows speed response means, responsive to the speed of an output shaft, to effect a change in the torque characteristic of the transmitter.

Referring now to FIGURES 20 to 25 of the drawings, different constructions of bucket wheels are shown, to provide the axially directed opening for the transmission of fluid into compartment 152.

In FIGURES 20 and 21, there is shown a freely rotatable weighted hollow shaft 50a, having a mass 226, to ensure that the skirt 51, will always be directed towards the axis of the carrier. The fluid rejected by the buckets 34, over their inner lips, in the direction of arrows 35, enter the skirt, and are rejected axially into the compartment 152.

In FIGURES 22 and 23, there is shown a hollow shaft, having openings 228 defined by lips standing proud of the inner surface of the hollow shaft, thereby permitting fluid entering the openings, to be rejected axially in the direction of arrow 35.

In FIGURES 24 and 25, there is shown a bucket wheel, having openings 230, disposed in the side wall 232, radially between the inner and outer lips 234 and 236 of the buckets 34, thereby permitting the axial rejection of some of the entrapped liquid through the openings 230. An opening 238 is provided in partition 240 of the drum 14 and in register with the openings 230, to permit the axial rejection of the fluid from the buckets 34. Not all the liquid will be rejected in the direction of arrow 35, some being rejected over the inner lips of the buckets, in the direction of arrows 35a.

Various other constructions may be devised, but the basic idea is to make use of the bucket wheels, to pump as it were, liquid from their own compartments, into another compartment, and thereby to achieve torque control.

We claim:

1. A torque transmitter which includes a carrier; at least one planet wheel mounted on the carrier to rotate about its own axis; a reservoir in the form of a drum co-axial with the carrier and a second axis and adapted to contain liquid, the carrier and drum being mounted to rotate about the second axis; a power input member connected to the carrier for connecting it to a source of rotary power; a sun wheel co-axial with the second axis; a power output member connected to the sun wheel for connecting it to a load to absorb rotary power; intermediate drive means drivingly connecting the planet wheel to the sun wheel and applying torque developed about the planet wheel axis in the same direction about the second axis; a bucket wheel coaxial with and connected to the planet wheel and having a plurality of buckets defining recesses spaced circumferentially about the planet wheel axis, the buckets having inner and outer lips defining openings directed in one direction about the planet wheel axis, and the bucket wheel having at least one axially directed opening out of it and disposed radially inwardly of the outer lips of the buckets relative to the planet wheel axis, and the bucket wheel being adapted to entrap liquid in the recesses from an annular layer of liquid within the drum when the carrier rotates about its axis and when the bucket wheel rotates about its axis relative to the carrier, and the buckets being adapted further to reject entrapped liquid radially inwardly and thence out of the bucket wheel via the axially directed opening.

2. A torque transmitter according to claim 1, in which the bucket wheel is mounted on a hollow shaft and in which the axially directed opening out of the bucket wheel is provided by the hollow shaft having an opening disposed radially inwardly of the inner lips of the buckets and an opening out of the hollow shaft and axially spaced from the first mentioned opening and outside the bucket wheel.

3. A torque transmitter according to claim 2, in which the hollow shaft is provided with a skirt around the opening disposed radially inwardly of the inner lips of the buckets, the skirt diverging towards the carrier axis.

4. A torque transmitter according to claim 3, and which includes fluid entrapment control means adapted to control the entrapment of liquid by the bucket wheel during rotation of the carrier.

5. A torque transmitter according to claim 4, in which the bucket wheel has radial openings into it between adjacent buckets and in which the fluid entrapment control means includes a shroud around the bucket wheel and coaxial with it and having a plurality of circumferentially spaced axially directed cover members at a pitch corresponding to the spacing between buckets and projecting over the buckets of the bucket wheel, the connection between the planet wheel and bucket wheel being resilient; whereby under load conditions exceeding a predetermined load, the bucket wheel and shroud are displaced arcuately relative to each other about their axes, thereby causing the cover member of the shroud to be displaced to cover the radial openings between adjacent buckets, thereby controlling the entrapment of liquid from the annular layer.

6. A torque transmitter according to claim 5, in which the fluid entrapment control means includes cam faces provided co-axially on the planet wheel and shroud, follower members connected to the bucket wheel and co-operating with the cam faces, and projections on the outer surface of the shroud.

7. A torque transmitter according to claim 4, in which the drum and carrier are integral and in which the carrier has a plurality of compartments, one of which contains the bucket wheel and in which the axially directed opening out of the bucket wheel is arranged to discharge into a compartment other than the bucket wheel compartment, at least one connecting port being provided to interconnect the compartments, and in which the fluid entrapment flow control means includes preventing means to prevent fluid flow into the bucket wheel compartment, the bucket wheel being adapted to displace liquid from its own carrier compartment into another carrier compartment via the axially directed opening.

8. A torque transmitter according to claim 7, in which the preventing means includes a movable closure member adapted to seat sealingly on the port, and control means to displace the closure member relative to the port.

9. A torque transmitter according to claim 8, in which the preventing means includes a sleeve member coaxial with the carrier and connected to the closure member, the control means being arranged to displace the sleeve axially to position the closure member.

10. A torque transmitter according to claim 8, in which the control means includes a resilient connection permitting resilient arcuate displacement between the power input member and the carrier, and being adapted to utilize such displacement to position the closure member.

11. A torque transmitter according to claim 8, in which the control means includes a resilient connection permitting resilient relative arcuate displacement between the sun wheel and the power output member, and being adapted to utilize such displacement to position the closure member.

12. A torque transmitter according to claim 10, in which the resilient connection is a torsion shaft.

13. A torque transmitter according to claim 11, in which the control means includes a sleeve co-axial with the power output member and passing axially and rotatably into the carrier, and being connected to the closure member, bias means to bias the sleeve axially towards an initial position relative to the power output member, and means responsive to speed of the power output member adapted to displace the sleeve and hence the closure member against the action of the bias means.

14. A torque transmitter according to claim 8, in which in addition at least one further planet wheel, a connected bucket wheel, intermediate drive means, and a sun wheel are provided in a compartment separate from the existing planet wheel and associated parts, the closure member being adapted to control the flow of liquid between the compartments, and in which there is provided an output shaft, and a gear train including a free-wheel device connecting the output shaft to the power output member of either sun wheel, the other sun wheel being connected to the output shaft via a different ratio, whereby the torque generating characteristic of the torque transmitter may be changed by positioning the closure member to admit or prevent the flow of liquid into a compartment.

15. A torque transmitter according to claim 8, in which the control means includes a sleeve co-axial with the carrier axis, and being axially displaceable relative to the carrier, the closure member being connected to the sleeve, and in which there are provided bias means urging the closure member to seat sealingly on the port, and speed response means responsive to the speed of the carrier and adapted at a predetermined speed of the carrier to displace the sleeve against the action of the bias means, thereby permitting fluid to enter the bucket wheel compartment and thereby permitting the generation of torque by the bucket wheel.

16. A torque transmitter according to claim 10, in which there are provided in addition at least one further planet wheel, a connected bucket wheel, intermediate drive means, and a sun wheel in a compartment separate from the existing planet wheel and associated parts, the closure member being adapted to control the flow of liquid between the compartments, an output shaft, a gear train including a free-wheel device connecting the output shaft to the power output member of either sun wheel, the other sun wheel being connected via another ratio to the output shaft; whereby the torque generating characteristic of the torque transmitter may be changed by the displacement of the closure member as a result of relative arcuate displacement between the power input member and the carrier, thereby admitting or preventing a flow of liquid into a compartment.

17. A torque transmitter according to claim 11, in which the resilient connection is an output shaft which is a torsion shaft connected to the sun wheel; and in which there are provided a sleeve co-axial with and around the output shaft, the sleeve having circumferentially spaced axially projecting fingers; a control sleeve keyed to the output shaft and connected to the closure member and having circumferentially spaced slots and ridges in its bore adapted to slide axially into engagement with the fingers of the sleeve; bias means to urge the ends of the ridges of the control sleeve into abutment with the ends of the fingers of the sleeve, the fingers and ridges being in register under no load and abutting end-on; and resetting means to displace the control sleeve axially against the action of the bias means; whereby under a predetermined torque relative torsional displacement between sleeve and control sleeve will take place, the fingers coming into register with the slots, thereby permitting axial displacement of the control sleeve under the action of the bias means, and hence displacement of the closure member to seat on the port to prevent re-entry of liquid into the bucket wheel compartment.

18. A torque transmitter according to claim 11, in which the resilient connection is an output shaft which is a torsion shaft connected to the sun wheel; and in which there are provided a sleeve co-axial with and around the output shaft, the sleeve having circumferentially spaced axially projecting fingers; a control sleeve keyed to the output shaft and connected to the closure member and having circumferentially spaced axially extending slots and ridges in its bore adapted to slide axially into engagement with the fingers of the sleeve; bias means to urge the control sleeve axially out of engagement with the fingers of the sleeve, the fingers and ridges being in register under no load; and speed response means responsive to the speed of the carrier and arranged in operation to urge the control sleeve axially against the action of the bias means; whereby under a predetermined load torque on the output shaft relative torsional deflection between the control sleeve and sleeve will take place sufficient to bring the fingers and slots into register, thereby permitting the speed response means to displace the control sleeve axially and also the closure member, thereby closing off the port and thereby preventing re-entry of the liquid into the bucket wheel compartment.

19. A torque transmitter according to claim 14, in which the positioning of the closure member takes place automatically by speed response means responsive to the speed of one of the power output members, the speed response means comprising a control sleeve co-axial with and axially slidable on the connected power output member, the closure member being connected to the control sleeve, a pair of swing weights pivotally connected via links to the control sleeve and to the power output member, and bias means urging the sleeve and closure member axially relative to the carrier to seat on the port, the swing weights being adapted to displace the closure member against the action of the bias means to open the port when rotating at a predetermined minimum speed, thereby admitting fluid into another bucket wheel compartment and thereby automatically changing the torque characteristic of the transmitter.

No references cited.

DAVID J. WILLIAMOWSKY, *Primary Examiner.*

T. C. PERRY, *Assistant Examiner.*